United States Patent
Shepodd et al.

[11] Patent Number: 6,063,307
[45] Date of Patent: *May 16, 2000

[54] POLYMER SYSTEM FOR GETTERING HYDROGEN

[76] Inventors: Timothy Jon Shepodd, 330 Thrasher Ave.; LeRoy L. Whinnery, 4929 Julie St., both of Livermore, Alameda County, Calif. 94550

[*] Notice: This patent is subject to a terminal disclaimer.

[21] Appl. No.: 09/182,405

[22] Filed: Oct. 29, 1998

Related U.S. Application Data

[62] Division of application No. 08/716,752, Sep. 23, 1996, Pat. No. 5,837,158.

[51] Int. Cl.⁷ .............................. H01J 7/18; H01J 35/20; H01K 1/56; C01B 3/50
[52] U.S. Cl. .................................... 252/181.6; 252/181.1; 252/181.7; 252/184; 423/248
[58] Field of Search ............................. 252/181.1, 181.6, 252/188.28, 181.7, 184, 181.2; 423/226, 230, 245.1, 248

[56] References Cited

U.S. PATENT DOCUMENTS

| | | | |
|---|---|---|---|
| 3,416,899 | 12/1968 | Schiff | 44/7 |
| 3,673,281 | 6/1972 | Bronstert | 525/339 |
| 3,896,042 | 7/1975 | Anderson et al. | 252/184 |
| 3,963,826 | 6/1976 | Anderson et al. | 423/248 |
| 3,980,501 | 9/1976 | Feder et al. | 429/60 |
| 3,992,561 | 11/1976 | Hargis et al. | 526/181 |
| 4,405,487 | 9/1983 | Harrah et al. | 252/194 |
| 4,668,424 | 5/1987 | Sandrock | 252/181.3 |
| 4,952,465 | 8/1990 | Harris et al. | 429/60 |
| 4,985,471 | 1/1991 | Ohta et al. | 522/27 |
| 5,605,996 | 2/1997 | Chuu et al. | 526/340 |
| 5,624,598 | 4/1997 | Shepodd et al. | 252/182.12 |
| 5,627,239 | 5/1997 | Ching et al. | 525/330.6 |

*Primary Examiner*—Joseph D. Anthony
*Attorney, Agent, or Firm*—Timothy Evans

[57] ABSTRACT

A novel composition comprising organic polymer molecules having carbon-carbon double bonds, for removing hydrogen from the atmosphere within enclosed spaces.

Organic polymers molecules containing carbon-carbon double bonds throughout their structures, preferably polybutadiene, polyisoprene and derivatives thereof, intimately mixed with an insoluble catalyst composition, comprising a hydrogenation catalyst and a catalyst support, preferably Pd supported on carbon, provide a hydrogen getter composition useful for removing hydrogen from enclosed spaces even in the presence of contaminants such as common atmospheric gases, water vapor, carbon dioxide, ammonia, oil mists, and water. The hydrogen getter composition disclosed herein is particularly useful for removing hydrogen from enclosed spaces containing potentially explosive mixtures of hydrogen and oxygen.

17 Claims, 1 Drawing Sheet

POLYMER SYSTEM FOR GETTERING HYDROGEN

The following application for U.S. Patent is a division of U.S. patent application Ser. No. 08/716,752, filed Sep. 23, 1996, now U.S. Pat. No. 5,837,158 entitled POLYMER FORMULATION FOR GETTERING HYDROGEN from which priority is hereby claimed.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to methods of removing hydrogen and its isotopes from various atmospheres within enclosed spaces and particularly to the use of novel organic polymer formulations combined with hydrogenation catalysts, as absorbers of hydrogen and its isotopes.

In many applications the presence of hydrogen and its isotopes, arising from various chemical and electrochemical corrosion reactions, can be detrimental. Hydrogen can evolve from corrosion by atmospheric gases; corrosion generated by stray electric currents; from electronic devices, which can include batteries, operating in normal or abnormal condition; corrosion in heat exchangers; and from leaky hydrogen piping. The accumulation of hydrogen can present a significant fire and/or explosion hazard particularly in sealed components where special precautions may need to be taken to prevent dangerously high internal pressures from developing. Mechanical and electrical safety devices, such as pressure relief valves can be expensive, unreliable, and particularly for small devices, not always practical. In the case of heat exchangers, the accumulation of hydrogen within the heat exchanger causes the thermal insulating and heat transfer properties of the heat exchanger to degrade over time.

It has long been known that hydrogen absorbing materials, known as getters, can be used to counteract hydrogen accumulation. Ayers et al. discuss the use of active metals such as zirconium or titanium, and alloys thereof in U.S. Pat. No. 4,512,721. These metals are capable of maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption.

Labaton, in U.S. Pat. No. 4,886,048, describes another means for removing hydrogen by reacting the hydrogen with oxygen to form water, in the presence of a noble metal catalyst such as palladium, and trapping the water on a water absorbing material such as a molecular sieve. However, hydrogen getters of this type are expensive, bulky, limited by the availability of oxygen, and capable of causing a detonation if improperly formulated.

Conventional hydrogen getters, such as those described in the above-referenced patents are expensive, can require special operating conditions such as high temperature regimes or ancillary reactants in order to maintain low hydrogen partial pressures, generally will not work well or at all in the presence of water, may require the presence of oxygen, be poisoned by oxygen, and may pose significant safety hazards, including fire and explosion if handled improperly, for example exposure to air.

It is well known in the art that unsaturated carbon-carbon bonds (i.e., double or triple bonds between carbon atoms) can be reduced by hydrogen and its isotopes in the presence of an appropriate catalyst to form an alkane (see, for example, Fieser, L. F. and Fieser, M., *Textbook of Organic Chemistry*, D. C. Heath & Co. 1950, pp. 66–69 and 86). Anderson et al. in U.S. Pat. Nos. 3,896,042 and 3,963,826 and Harrah et al. in U.S. Pat. No. 4,405,487 disclose the use of solid acetylenic compounds (i.e., organic compounds having carbon-carbon triple bonds) combined with various Group VIII metal catalysts to irreversibly remove hydrogen over the temperature range −50° C. to 110° C. Shepodd et al. in co-pending application Ser. No. 08/424,775, disclose acetylenic hydrogen getters suitable for use at temperatures above 100° C., preferably from about 125° C. to 200° C.

In these getter systems an acetylenic compound, is mixed with a hydrogenation catalyst, typically a metal selected from Group VIII of the Periodic Table, preferably palladium, platinum or rhodium, although other catalysts are possible. When exposed to hydrogen or its isotopes, the unsaturated carbon-carbon bonds are irreversibly converted to their hydrogenated analog with the aid of the associated catalyst, consequently the reaction can be carried out in a vacuum or in a liquid and is unaffected by the presence of normal atmospheric gases or water.

The thermodynamics of hydrogenating unsaturated carbon-carbon bonds in an organic compound by means of a catalyst greatly favors the saturated compound. Thus, these heterogeneous reactions are substantially irreversible under typical hydrogenation conditions. Furthermore, for hydrogenation of an unsaturated carbon-carbon bond to take place it is necessary not only that the hydrogen gas but also the catalyst that mediates the reaction be proximate the unsaturated bond. Where small organic molecules are used such as, 1,4-diphenylbutadiyne or 1,4-bis(phenylethynyl) benzene, the required reactive association can take place relatively easily in comparison with polymer molecules that are the preferred species of organic compound for use in a hydrogen getter composition, because of the higher concentration of reaction sites per molecule. In large polymer molecules generally, the reactive association between hydrogen gas, the unsaturated carbon-carbon bond in the organic molecule, and the catalyst, can only take place with difficulty, if at all.

Relative motion between the catalyst molecules and the organic molecules in a hydrogen getter can be considered in two different contexts. One, viscous flow, wherein the entire formulation, organic getter and catalyst, itself flows. In the other, motion of the organic molecules themselves, within the getter formulation, causes various unsaturated portions of an organic molecule to come into contact with hydrogen gas and a hydrogenation catalyst contained in a catalyst composition. In many applications viscous flow is undesirable and binders or other viscous flow inhibiting agents can be added to the getter formulation to immobilize it. On the other hand, molecular motion, allowing reactive association between the unsaturated bonds in the organic compound and the hydrogenation catalyst, is critical to the efficient functioning of an organic hydrogen getter. Long chain polymer molecules having a plurality of reactive sites (i.e., unsaturated carbon-carbon bonds) per molecule are preferable as the organic constituents of an organic hydrogen getter and polymer molecules having triple bonds within their structures are particularly preferred since they have twice the hydrogenation capacity of double bonds. Therefore, it will be appreciated that polymer molecules having a plurality of carbon-carbon triple bonds are the most desirable materials for use in a hydrogen getter. However, these materials are uncommon, expensive, and can react with common atmospheric gases such as water vapor and oxygen. Furthermore, their restricted mobility vis-à-vis interactions with the catalyst mitigates against them.

What is desired is a hydrogen getter incorporating long chain polymer molecule, having a plurality of unsaturated carbon-carbon double bonds, that is inexpensive and readily available, is unaffected by common atmospheric gases and will function effectively in the presence of high concentrations of water vapor, oxygen, carbon dioxide, ammonia and liquid water.

SUMMARY OF THE INVENTION

The organic hydrogen getter system disclosed herein provides a novel solution to the problem of maintaining low partial pressures of hydrogen and its isotopes in various atmospheres and particularly, for ensuring uniform controlled reaction between the organic reactant and hydrogen in the presence of oxygen, thereby promoting safe and efficient hydrogenation in an oxygen containing atmosphere. Further, the organic hydrogen getter system disclosed herein has significant advantages over conventional hydrogen getter systems namely, low risk of fire or explosion, no requirement for high temperature activation or operation, the ability to absorb hydrogen even in the presence of contaminants such as common atmospheric gases, water vapor, carbon dioxide, ammonia, liquid water and oil mists. Moreover, if oxygen is present the organic getter system of the present invention provides both a heat sink as well as a diluting medium to control the potentially explosive reaction between hydrogen and oxygen.

The present invention is directed to the use of organic polymers containing carbon-carbon double bonds throughout their structures, preferably polybutadiene, polyisoprene and functionalized derivatives thereof, intimately mixed with an insoluble noble metal catalyst composition, preferably Pd supported on carbon.

DETAILED DESCRIPTION OF THE INVENTION

Figure 1:
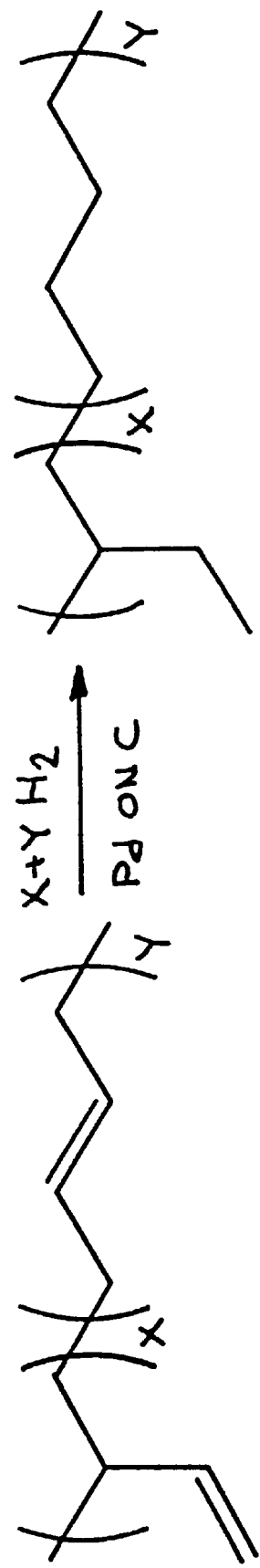
FIG. 1 illustrates the hydrogenation of a polymer molecule containing carbon-carbon double bonds.

The present invention is directed to a novel composition comprising organic polymer molecules having carbon-carbon double bonds, for removing hydrogen and its isotopes from the atmosphere within enclosed spaces and particularly from atmospheres within enclosed spaces that contain oxygen carbon dioxide and ammonia.

Hydrogenation of a carbon-carbon double bond in an organic compound by means of a hydrogenation catalyst, as illustrated in FIG. 1, is typically, an irreversible, exothermic, heterogeneous reaction. That is, hydrogenation (the addition of hydrogen to at least one unsaturated carbon-carbon bond) takes place at the boundary between the hydrogenation catalyst and the organic reactant. Consequently, in order to achieve the highest degree of effectiveness the getter materials should preferably be prepared using techniques that ensure that the hydrogenation catalyst is in reactive association with the unsaturated carbon-carbon bonds of the organic reactant compound. The preferred method is to dissolve the organic reactant in a suitable solvent, such as pentane or petroleum ether, adding a catalyst composition, that is hydrogenaton catalyst, preferably palladium, fixed on an inert substrate that can be carbon, diatomaceous earth or asbestos or inorganic minerals or salts, evaporating the solvent and drying the resulting powder. Getter materials can also be prepared by mixing an appropriate catalyst composition with a liquid organic material that can be produced by melting the organic compound.

The heterogeneous nature of organic hydrogen getters causes a distribution of reaction sites that react at different rates. While in principle, the getter will not stop reacting until all the unsaturated carbon-carbon bonds have been hydrogenated, in practice, the rate becomes vanishingly small as the getter approaches saturation. Furthermore, for hydrogenation of an unsaturated carbon-carbon bond to take place in an organic hydrogen getter it is necessary not only that the hydrogen gas but also the hydrogenation catalyst that promotes the reaction be proximate the unsaturated bond(s). Thus, in addition to ensuring that the catalyst is distributed as uniformly as possible throughout the organic hydrogen getter, it is necessary to provide for movement of the organic getter molecules such that as many as possible of the unsaturated bonds in the organic molecule are brought into reactive association with a hydrogenation catalyst. While this is relatively easy to accomplish for small organic molecules it is extremely difficult for long chain polymer molecules. Incorporation of enough hydrogenation catalyst for each unsaturated bond in a long chain polymer molecule would be prohibitively expensive and would reduce the getters capacity.

Long chain organic polymer molecules having multiple carbon-carbon double bonds have hydrogen absorption capacities (measured as the amount of hydrogen that can irreversibly react with each gram of getter) comparable to the more conventional organic hydrogen getter molecules such as 1,4-phenylbutadiyne (444 std cc/g), or 1,4-bis (phenylethynyl)benzene (322 std cc/g) used in conventional organic hydrogen getters. By way of example, the homopolymer polybutadiene has a theoretical capacity for hydrogen absorption of 378 std cc/g. The inventors have discovered that by employing a long chain organic polymer molecule having a low glass transition temperature ($T_g$), such as polybutadiene, it is possible to formulate an organic hydrogen getter that possesses a high capacity for hydrogen absorption as well as a high hydrogenation efficiency. Having a low $T_g$ endows the polymer molecule with fluid-like properties that permit movement of the polymer molecule itself, thereby bringing unsaturated bonds in the molecule into reactive association with the hydrogenation catalyst to provide for hydrogenation of the unsaturated bond. Lower molecular weight polymer chains that can move more rapidly to a catalyst site demonstrate enhanced reactivities.

It will be appreciated that hydrogen and oxygen can form explosive mixtures over the concentration range of about 6 to about 70 vol % $H_2$. A high temperature source such as a spark or flame can initiate explosive reaction of this gas mixture. Noble metal hydrogenaton catalysts, especially when heated can also initiate ignition of a hydrogen/oxygen gas mixture within the explosive concentration range. Two reactions occur simultaneously during the course of hydrogenating the unsaturated bonds in an organic polymer in the presence of oxygen. One is the combination of hydrogen and oxygen in the presence of a catalyst to make water. The second is the hydrogenation of the carbon-carbon double bonds in the polymer. The generation of heat with the consequent heating of surrounding material occurs both as hydrogen and oxygen combine exothermically and rapidly in the presence of a catalyst to make water as well as a consequence of the hydrogenation of the unsaturated carbon-carbon bonds in the organic polymer molecule. If means to control the reaction rate are not provided, such as that described in the present invention, detonation of the hydrogen/oxygen gas mixture can take place. The inventors have discovered that in addition to their ability to absorb hydrogen, the fluid polymers of the present invention have an additional advantage in that they can moderate the explosively rapid reaction that can take place between hydrogen and oxygen, in the presence of a catalyst, making a detonation unlikely. It is believed that the unsaturated polymers of this invention allow safe removal of hydrogen from $H_2/O_2$ mixtures because hydrogenation of the unsaturated carbon-carbon double bonds provides a competitive reaction to the potentially explosive $H_2/O_2$ combination reaction. Further, the getter material provides a heat sink to prevent localized overheating, and a diluting medium to restrict access of hydrogen and oxygen to the catalyst thereby slowing the $H_2/O_2$ reaction.

In addition to functioning as an efficient hydrogen getter in hydrogen/oxygen atmospheres, the inventors have discovered that the hydrogen getters of the present invention also function efficiently to remove hydrogen from hydrogen atmospheres, hydrogen/inert gas (e.g., He, Ar, $N_2$), hydrogen/ammonia atmospheres, such as may be encountered in heat exchangers, and hydrogen/carbon dioxide atmospheres. Water vapor and common atmospheric gases have no adverse effect on the ability of these getter materials to absorb hydrogen. Liquid water does not have an adverse effect on the efficiency of these hydrogen getters except that the reaction with hydrogen can be limited by the rate at which hydrogen can diffuse through liquid water.

Because the hydrogenation of unsaturated carbon-carbon bonds can be highly exothermic, provision must be made, in some cases, for efficient removal of the heat of reaction from the hydrogen getter materials. Materials such as inert powders, or preferably excess catalyst composition, may be added to the getter compound to assist in removing excess heat generated by the hydrogenation reaction.

Getter formulations require the proper concentration of hydrogenation catalyst for optimum performance. Additional catalyst will speed the reaction but reduce the capacity per given mass of formulated getter. Too little catalyst will increase the ultimate capacity per given mass of formulated getter to absorb hydrogen, but may slow the reaction or reduce the efficiency such that not all of the stoichiometric capacity will be used. Changing the hydrogenation catalyst or the composition of the unsaturated organic compound requires careful evaluation of the proper catalyst concentration in order to optimize reaction rates vs. the capacity needed and the cost of the catalyst in a particular application. Preferably, about 5–75 weight percent of a catalyst composition that comprises about 0.1–10 weight percent noble metal hydrogenation catalyst (preferably Pd) is most effective for hydrogenating the polymers of the present invention for a variety of different conditions. In those instances where the catalyst is also intended to function as a heat sink to moderate rapid exothermic hydrogenation, the catalyst composition concentration may be raised to higher values, preferably less than about 95 wt %.

Fillers that are inert with respect to reaction with hydrogen can perform many functions and be included in the hydrogen getter formulation in many forms. The simple addition of inert polymers, thixotropic agents, minerals, or carbon powders will mediate the reaction rate, act as a heat sink, and modify the physical properties of the getter. The primary usefulness of these materials is to provide a method for removing hydrogen at a moderated rate from $H_2/O_2$ mixtures, particularly when a hydrogen/oxygen explosion is a concern. The filler concentration can be as high as 95 wt %, however, when the proportion of filler is greater than about 75 wt %, the capacity of the getter is diminished.

The hydrogenation rate as well as the physical properties of the organic polymer hydrogen getters of the present invention can also be modified by adding various functionalized substituents to the unsaturated polymer molecule prior to and during formulation. These added functionalities can serve to change the physical properties of the hydrogen getter for ease of processing or for providing a more convenient final form (i.e., powder, pellet, thermosetting resin, etc.) by undergoing reactions of their own, such as cross-linking, that do not effect the theoretical hydrogen capacity of the hydrogen getter. Further, these added functionalities can moderate the reactivity of the hydrogen getter in a manner similar to that of the inert filler powders set forth above. As long as the getter polymers retain sufficient molecular mobility to provide reactive association between the polymer and hydrogenation catalyst during hydrogenation, these functionalized substituents attached to the polymer chain have no adverse effect on either the capacity or efficiency of the hydrogen getter. Functionalized substituents that cause crosslinking can slow the hydrogenation of the organic polymer getter. Such additional functionalized substituents groups can be selected from the group consisting of hydrogen, $C_2$–$C_8$ alkenes, $C_2$–$C_8$ alkynes, $C_1$–$C_8$ ethers, $C_1$–$C_8$ esters, $C_1$–$C_{10}$ anhydrides, $C_1$–$C_8$ epoxides, $C_1$–$C_8$ isocyanates, $C_1$–$C_8$ alcohols, $C_1$–$C_8$ ketones, $C_1$–$C_8$ carboxylic acids, and phenyl.

The present invention now will be described more fully hereinafter by way of various examples illustrative of the invention. This invention may, however, be embodied in many different forms and should not be construed as limited to the embodiment set forth herein.

EXAMPLE 1

8 g of inhibitor-free polybutadiene was dissolved in 14 g of pentane in a reaction vessel. The catalyst, 3 g of 1% Pd on C, and 9 g carbon black was added and the three components swirled to make a slurry. This slurry was stirred vigorously and the solvent was allowed to evaporate. Final traces of solvent are removed from the getter using a vacuum oven (<1 torr at 75° C.) until the sample has been dried to a constant mass. The black rubbery getter product is isolated from this procedure in 100% yield and has a stoichiometric hydrogen capacity of 166 std cc $H_2$/g. Depending upon the application, the getter may be powdered or pressed into pellets.

EXAMPLE 2

17 g of polybutadiene/polystyrene copolymer (20 wt % styrene) dissolved in petroleum ether was combined with 30 g of 5% Pd on carbon catalyst and vigorously mixed. The solvent was removed using a rotary evaporator then the getter was dried under vacuum (<1 torr) to constant mass. The resulting getter is isolated in 100% yield as a black powder having a theoretical hydrogenation capacity of 120 std cc $H_2$/g.

EXAMPLE 3

5.1 g of hydroxyterminated polybutadiene was dissolved in 30.5 g of an inhibitor free 35 wt % polybutadiene in pentane solution. 2.5 g of carbon powder, 2.5 g of 1% palladium on carbon, and 5.1 g of polybutadiene maleic anhydride homopolymer were sequentially mixed into the polybutadiene/pentane solution. To cross-link the anhydride and alcohol functionalities 0.6 g of a catalyst (Emicure, EMI-24) was stirred into the mixture. After 30 minutes at room temperature, the remaining pentane was removed under vacuum. A porous rubbery black solid product having a theoretical uptake capacity of 325 std cc $H_2$/g was produced.

EXAMPLE 4

6.0 g of cis-polyisoprene solution (15 w % in pentane) was mixed vigorously with 9 g of 5% Pd on carbon and the solvent removed under vacuum to yield a black rubbery powder having a theoretical hydrogenation capacity of 132 std cc $H_2$/g.

The following examples illustrate the process of hydrogenation of the hydrogen getter materials, prepared as described above, in various atmospheres. For convenience, these experiments are terminated after the majority of the hydrogen has reacted. In all cases the getter was still actively reacting with hydrogen when data collection was terminated. However, as shown hereinbelow, the reaction rate decreases markedly as the hydrogenation reaction nears completion.

It should be noted that some of the hydrogenations in the following examples involve explosive mixtures of hydrogen and air (oxygen). As is well known to those skilled in the art, extreme caution and appropriate shielding should always be used if there is any potential through the course of an experiment to generate a potentially explosive hydrogen/oxygen mixture.

Hydrogenation in Air

EXAMPLE 5

3.1 g of a hydrogen getter pellet, prepared from the material described in EXAMPLE 1, was placed in a reactor containing 3.6 psia of laboratory air at 20° C. Hydrogen gas (241 std cc, 47% of the theoretical hydrogen capacity) was then added to the reactor. The reactor was maintained at room temperature and the hydrogen gas pressure was monitored for 950 minutes at which time most of the hydrogen had reacted. Two reactions occurred simultaneously during the course of this experiment. One was the catalytic combination of hydrogen and oxygen to make water. The second was the hydrogenation of the carbon-carbon double bonds in the polymer. Separate hydrogenation rates for each reaction were not quantified from this experiment, but overall rates based on pressure drop yield general information about the removal of hydrogen. Calculated approximate hydrogen reaction rates, based on pressure measurements, are shown below:

| Time (min.) | Reaction Rate (std cc/g–h) |
|---|---|
| 0–100 | 26 |
| 200–300 | 2.0 |
| 800–900 | 0.73 |

When oxygen is present, the catalytic combination of oxygen with hydrogen to form water is usually faster than hydrogenation of carbon-carbon double bonds. If catalytic water formation were the only reaction occurring in this experiment, the oxygen could consume 96 std cc $H_2$ representing a 2.1 psi pressure drop. The total pressure drop of 3.2 psi proves that polymer was hydrogenated also.

Nuclear Magnetic Resonance (NMR) analysis can be used to quantify polymer hydrogenation. NMR analysis of the polymer before and after the experiment confirms that about 25% of the carbon-carbon double bonds were hydrogenated and demonstrates that the pressure drop solely due to polymer hydrogenation is approximately 1.9 psi. When the experiment was stopped approximately 70% of the hydrogen was incorporated into the polymer (representing 25% of the hydrogenation capacity) and 30% was converted into water.

EXAMPLE 6

5.1 g of a hydrogen getter prepared from a mixture of the polymers described in EXAMPLES 1 and 2 were placed in a reactor. This getter had a hydrogenation capacity of 122 std cc $H_2$/g. A mixture of hydrogen gas (307 std cc, 49% of the theoretical capacity) and air (3.6 psia) was then added to the reactor. The reactor was maintained at room temperature and the gas pressure was measured for 2000 minutes. Calculated instantaneous hydrogen reaction rates, based on pressure measurements, are shown below:

| Time (min.) | Reaction Rate (std cc/g–h) |
|---|---|
| 0–10 | 107 |
| 0–20 | 71 |
| 1000–1500 | 0.1 |

About 80% of the hydrogen was incorporated into the polymer (representing 22% of the hydrogenation capacity) and the remainder converted into water.

EXAMPLE 7

4.1 g of a sample prepared as detailed in EXAMPLE 3 was placed in reactor containing 3.5 psia air. Hydrogen gas (239 std cc, 18% of the theoretical hydrogen capacity) was added to the reactor and the pressure monitored. Calculated hydrogen reaction rates, based on pressure measurements, are shown below:

| Hydrogenation in inert atmosphere | |
|---|---|
| Time (min.) | Reaction Rate at 20° C. (std cc/g–h) |
| 0–10 | 6.1 |
| 200–400 | 1.9 |
| 900–1000 | 0.31 |

EXAMPLE 8

2.5 g of a hydrogen getter prepared as described in EXAMPLE 1 was placed in a reactor containing 3.6 psi helium. Hydrogen gas (310 std cc, 74% of the theoretical hydrogen capacity) was then added to the reactor and the pressure monitored for 24 hours. Calculated hydrogen reaction rates, based on pressure measurements, are shown below:

| Time (min) | Reaction Rate (std cc $H_2$/g–h) |
|---|---|
| 0–100 | 3.5 |
| 200–300 | 2.3 |
| 800–900 | 1.1 |

The experiment was stopped when 33% of the hydrogen had reacted representing 24% of the theoretical capacity of the getter sample. Nuclear Magnetic Resonance (NMR) analysis of the polymer before and after the experiment confirms that about 25% of the carbon-carbon double bonds were hydrogenated.

Hydrogenation in Hydrogen Atmosphere

EXAMPLE 9

1.0 g of the getter prepared in EXAMPLE 2 was placed under vacuum to remove adsorbed gases then exposed to hydrogen (121 std cc, 106% of the theoretical hydrogen capacity) while the pressure was monitored. The reactor remained at 20° C. for 90 minutes and then was heated to 47° C. and equilibrated for 10 minutes whereupon the reaction rate increased. After measuring the rates at elevated temperature, the reactor was cooled to 20° C. and the experiment was continued until terminated after a total of 1400 min. Calculated hydrogen reaction rates, based on pressure measurements, are shown below:

| Time (min.) | Reaction Rate at 20° C. (std cc $H_2$/g–h) |
| --- | --- |
| 0–20 | 74 |
| 60–80 | 3.1 |
| 100–110 | 75 |

At the conclusion of the test run the hydrogen getter adsorbed 71% of its theoretical hydrogen capacity.

EXAMPLE 10

1.6 g of the getter prepared as detailed in EXAMPLE 1 was exposed to 3.6 psia air and heated to 110° C. Hydrogen gas, (246 std cc, 95% of the theoretical hydrogen capacity) was added and after a short period of pressure increase (while the cool hydrogen equilibrated at 110° C.) the pressure dropped in a fashion similar to that observed in the other hydrogenation reactions. After approximately 1000 minutes the temperature was raised to 150° C. for 1 hour then the entire reactor was returned to room temperature. Calculated reaction rates, based on pressure measurements, are shown below:

| Time (min.) | Reaction Rate (std cc/g–h) |
| --- | --- |
| 45–55 | 114 |
| 200–300 | 11 |
| 800–900 | 1.6 |

The total pressure drop was 5.1 psi. The polymer was hydrogenated to 76% of the hydrogenation capacity. Approximately 70% of the hydrogen went into the polymer and 30% was converted into water.

Deuteration in Air

EXAMPLE 11

1.1 g of a sample prepared as detailed in EXAMPLE 4 was placed in reactor containing 3.6 psia air. Deuterium gas (205 std cc, 145% of the theoretical deuterium capacity) was added and the pressure monitored. Calculated reaction rates, based on pressure measurements, are shown below:

| Time (min.) | Reaction Rate (std cc/g–h) |
| --- | --- |
| 1–11 | 262 |
| 190–310 | 1.0 |
| 800–1000 | 0.6 |

The total pressure drop in the experiment was 2.5 psi. More than 95% of the pressure drop occurred within 150 min. Polymer deuteration represented about 40% of the pressure drop. Approximately equal amounts of deuterium were converted into deuterium oxide and deuterated polymer (representing approximately 56% of the hydrogenation capacity).

EXAMPLE 12

Hydrogenation in Ammonia 3.9 g of a sample prepared as detailed in EXAMPLE 1 was placed in reactor containing 18.2 psia ammonia. Hydrogen gas (241 std cc, 38% of the theoretical hydrogen capacity) was added to the reactor and the pressure monitored. The experiment continued at 20° C. for 1000 in when the temperature was raised first to 55 then 90° C. The reaction rate increased at the higher temperature. Calculated hydrogen reaction rates, based on pressure measurements, are shown below:

| Time (min) | Reaction Rate (std cc $H_2$/g–h) |
| --- | --- |
| 10–110 | 4.6 |
| 500–600 | 1.0 |
| 1130–1160 | 6.6 (90° C.) |

The experiment was stopped when 76% of the hydrogen had reacted representing 28% of the theoretical capacity of the getter sample.

Hydrogenation in Carbon Dioxide

EXAMPLE 13

1.5 g of a sample prepared as detailed in EXAMPLE 1 was placed in reactor containing 7.0 psia carbon dioxide. Hydrogen gas (245 std cc, 97% of the theoretical hydrogen capacity) was added to the reactor and the pressure monitored. The experiment continued at 20° C. for 950 min when the temperature was raised to 48° C. The reaction sped up at the higher temperature. Calculated hydrogen reaction rates, based on pressure measurements, are shown below:

| Time (min) | Reaction Rate (std cc $H_2$/g–h) |
| --- | --- |
| 2–102 | 0.8 |
| 500–600 | 0.8 |
| 1100–1200 | 4.2 (48° C.) |

The experiment was stopped when 29% of the hydrogen had reacted representing 28% of the theoretical capacity of the getter sample.

From the foregoing description and examples, one skilled in the art can readily ascertain the essential characteristics of the present invention. The description and examples are intended to be illustrative of the present invention and are not to be construed as limitations or restrictions thereon, the invention being delineated in the following claims.

We claim:

1. A system for removing hydrogen and its isotopes from an enclosed space, comprising:

a) an enclosed space having an atmosphere contained therein; and b) a hydrogen getter composition contained within said enclosed space, said getter composition comprising:

i) an organic polymer, said organic polymer comprising a plurality of repeating monomer units, said units having up to six side branches, said side branches further comprising $C_1$–$C_8$ alkyl that contain or are substituted with one or more functionalities selected from the group consisting of $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid such that each said unit contains at least one carbon-carbon double bond;

ii) a hydrogenation catalyst consisting essentially of a noble metal catalyst and an inert catalyst support material, said hydrogenation catalyst distributed throughout said getter composition wherein said double bonds and said noble metal catalyst are in reactive association; and iii) an inert diluent, said diluent selected from the list consisting of carbon black powders, mineral powders, salts, thixotropic agents and combinations thereof.

2. The system of claim 1, wherein the atmosphere comprises hydrogen and a gas selected from the group consisting of air, water vapor, carbon dioxide, ammonia and oxygen and combinations thereof.

3. The system of claim 1, wherein the atmosphere comprises a mixture of hydrogen and oxygen and wherein the concentration of hydrogen is from about 6 to about 70 vol %.

4. The system of claim 1, wherein the noble metal catalyst is palladium or platinum.

5. The system of claim 1, wherein the concentration of said hydrogenation catalyst in said getter composition is from about 5 to about 75 weight percent hydrogenation catalyst, and wherein the hydrogenation catalyst contains about 0.1 to about 10 weight percent of the noble metal catalyst, based on the weight of the hydrogenation catalyst.

6. The hydrogen getter composition of claim 1, wherein the concentration of said inert diluent is less than about 95 weight percent of said getter composition.

7. The system of claim 1, wherein the catalyst support material comprises a porous, inert solid material.

8. The system of claim 7, wherein the porous inert solid material is selected from the list consisting of activated carbon, aluminum oxide, barium carbonate, and combinations thereof.

9. A system for removing hydrogen and its isotopes from an enclosed space, comprising:

a) an enclosed space having an atmosphere contained therein; and b) a hydrogen getter composition contained within said enclosed space, said getter composition comprising at least one of a polymeric compound consisting of units described by the following structural formulas:

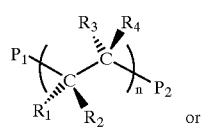

(I)

or

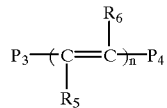

(II)

wherein;

$R_1$–$R_6$ may be the same or different and comprise hydrogen, or $C_1$–$C_8$ alkyl that contain or are substituted with one or more functionalities selected from the group consisting of hydrogen, $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid, wherein at least one of $R_1$–$R_4$ contain at least one carbon-carbon double bond, and wherein the functionalities may be partially reacted together, thereby crosslinking some or all of the polymer compound of formula (I) or formula (II);

$P_1$–$P_4$ are terminal groups selected from the group consisting of hydrogen or $C_1$–$C_8$ alkyl that contain or are substituted with one or more functionalities selected from the group consisting of hydrogen, $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid; and n is from 5–10000;

a hydrogenation catalyst consisting essentially of a noble metal catalyst and an inert catalyst support material, said hydrogenation catalyst distributed throughout said getter composition wherein said double bonds and said noble metal catalyst are in reactive association; and an inert diluent, said diluent selected from the list consisting of carbon black powders, mineral powders, salts, thixotropic agents and combinations thereof.

10. The system of claim 9, wherein said getter composition further comprises both of said polymeric compounds described by said formula (I) and said formula (II).

11. The system of claim 10, wherein the noble metal catalyst is palladium or platinum.

12. The system of claim 10, wherein the concentration of said hydrogenation catalyst in said getter composition is from about 5 to about 75 weight percent hydrogenation catalyst, and wherein the hydrogenation catalyst contains about 0.1 to about 10 weight percent of the noble metal catalyst, based on the weight of the hydrogenation catalyst.

13. The system of claim 10, wherein the concentration of said inert diluent is less than about 95 weight percent of said getter composition.

14. The system of claim 10, wherein the atmosphere comprises hydrogen and a gas selected from the group consisting of air, water vapor, carbon dioxide, ammonia, oxygen, and combinations thereof.

15. The system of claim 10, wherein the atmosphere comprises a mixture of hydrogen and oxygen and wherein further the concentration of hydrogen therein is about 6 vol % to about 70 vol %.

16. The system of claim 10, wherein the catalyst support material comprises a porous, inert solid material.

17. The system of claim 16, wherein the porous inert solid material is selected from the list consisting of activated carbon, aluminum oxide, barium carbonate, and combinations thereof.

* * * * *